United States Patent
Shiraki et al.

(10) Patent No.: US 7,071,681 B1
(45) Date of Patent: Jul. 4, 2006

(54) MAGNETIC POSITION DETECTING APPARATUS

(75) Inventors: Manabu Shiraki, Yamato (JP); Junichi Tada, Yamato (JP)

(73) Assignee: Shicoh Engineering Co., Ltd., Kanagawa (JP)

( * ) Notice: Subject to any disclaimer, the term of this patent is extended or adjusted under 35 U.S.C. 154(b) by 0 days.

(21) Appl. No.: 11/265,155

(22) Filed: Nov. 3, 2005

(30) Foreign Application Priority Data

Feb. 16, 2005 (JP) ............................. 2005-039048

(51) Int. Cl.
  *G01R 33/09* (2006.01)
  *G01B 7/14* (2006.01)
  *G01B 7/30* (2006.01)

(52) U.S. Cl. .................... 324/207.21; 324/207.24; 324/207.25

(58) Field of Classification Search ........... 324/207.21, 324/207.24, 207.25
See application file for complete search history.

(56) References Cited

U.S. PATENT DOCUMENTS 4,874,053 A * 10/1989 Kimura et al. ............. 180/443
5,909,115 A * 6/1999 Kano et al. ............. 324/207.21
6,600,308 B1 * 7/2003 Shirai et al. ............ 324/207.12

\* cited by examiner

*Primary Examiner*—Bot LeDynh
(74) *Attorney, Agent, or Firm*—Wenderoth, Lind & Ponack, L.L.P.

(57) ABSTRACT

In a position detecting apparatus 1 of the present invention, magnetic resistance circuits A and B of a first main circuit 10 include a reference magnetic resistance element +A, an even harmonic correction magnetic resistance element +A3, being placed at a position shifted by (1/4)λ or (3/4)λ from the reference magnetic resistance element +A, with respect to a reference wave, and a third harmonic correction magnetic resistance element +A2, being placed at a position shifted by (1/6)λ from the reference magnetic resistance element, with respect to a reference wave, and magnetic resistance circuits A' and B' of a second main circuit 20 include the magnetic resistance circuit of the second main circuit 20 includes a reference magnetic resistance element +A'1, a fifth harmonic correction magnetic resistance element +A'2, being placed at a position shifted by (1/10)λ from the adjacent magnetic resistance element, with respect to a reference wave and a fifth harmonic correction magnetic resistance element +A'2, being placed at a position shifted by (4/15)λ from the reference magnetic resistance element +A'1, with respect to a third harmonic wave.

8 Claims, 5 Drawing Sheets

MAGNETIC POSITION DETECTING APPARATUS

BACKGROUND OF THE INVENTION

1. Field of the Invention

The present invention relates to a position detecting apparatus for detecting a position of a driving member that linearly moves or rotates, and more particularly to a magnetic position detecting apparatus using magnetism.

2. Description of the Related Art

As a position detecting apparatus of this type, Examined Japanese Patent Publication Sho. No.54-41335 (prior art 1) discloses a structure in which one and the other magnetic resistance circuits, each having multiple magnetic resistance elements connected in series, are formed in a comb shape and one and the other magnetic resistance circuits are horizontally arranged along a magnetic pole array direction.

Unexamined Japanese Patent Publication Hei. No. 7-4987 (prior art 2) discloses a technique in which a groove is formed on a magnetized surface to shape an output waveform from a magnetic resistance circuit at a reference position.

However, in the technique of prior art 1, since the multiple magnetic resistance circuits in the magnetic position detecting apparatus are arranged along the magnetic pole array direction, when one magnetic resistance circuit has numerous magnetic resistance elements or numerous magnetic resistance circuits are provided, there is a problem in which the length in the circuit in the magnetic pole array direction is increased to cause enlargement in size of the position detecting apparatus and a decrease in resolution of the output waveform.

Moreover, in prior art 2, when the multiple magnetic resistance circuits are provided, there occurs a problem of enlargement in size of the position detecting apparatus, similar to prior art 1. Furthermore, in the position detecting apparatus for the driving member that rotates, there is a problem in which when a length of a position detecting apparatus in a width direction (magnetic pole array direction) is increased, electric field strength, which is received at both ends of the position detecting apparatus in the width direction, is reduced by its positional shift, so that resolution of the output waveform is decreased.

SUMMARY OF THE INVENTION

The present invention has been made with consideration given to the aforementioned circumstances and an object of the present invention is to provide a magnetic position detecting apparatus that is reduced in size and is excellent in resolution.

A position detecting apparatus according to a first aspect of the present invention includes first and second main circuits being arranged to be adjacent to each other, being displaced to be opposite to a magnetized surface where different magnetic poles are alternatively arrayed in one direction and being placed in a direction perpendicular to a pole array direction. Each main circuit includes a magnetic resistance circuit having multiple magnetic resistance elements that output current according to magnetic field intensity of the magnetized surface; a power supply terminal provided in each magnetic resistance circuit; and an output terminal. The multiple magnetic resistance elements are connected in series in the magnetic resistance circuit and arranged to be parallel to one another along a current path of each magnetic resistance element. The magnetic resistance circuit of each of the first main circuit and the second main circuit includes a reference magnetic resistance element, an even harmonic correction magnetic resistance element with respect to a reference wave, and an odd harmonic correction magnetic resistance element with respect to a reference wave.

According to the first aspect of the present invention, since the first main circuit and the second main circuit are arranged to be adjacent to each other in a direction perpendicular to a magnetic pole array direction, it is possible to reduce an area in the magnetic pole array direction and improve miniaturization of a position detecting apparatus 1. Particularly, the detection width of the position detecting apparatus is reduced with respect to the magnetic pole array direction, thus allowing a reduction in an interval difference and magnetic field intensity between each magnetic resistance element and the magnetized surface even when the magnetized surface is circularly shaped or curved. This makes it possible to obtain an output waveform with high resolution.

Moreover, according to the first aspect of the present invention, the outputs from the first and second main circuits are added to each other, thereby making it possible to gain a waveform obtained by amplifying the output doubled as compared with the normal case. Furthermore, in the first main circuit and second main circuit, the even harmonic component and odd harmonic component at each output waveform are corrected, thereby making it possible to obtain a sine waveform S and a cosine waveform C where a reference waveform H is adjusted as illustrated in FIG. 4. Such shaped sine waveform S and cosine waveform C are obtained, thereby making it possible to accurately detect a position in a width λ and improve resolution.

It is preferable that the odd harmonic correction magnetic resistance element of the first main circuit may be a third harmonic correction magnetic resistance element with respect to the reference wave, and that the odd harmonic correction magnetic resistance element of the second main circuit may be a fifth harmonic correction magnetic resistance element.

Among odd harmonic components, third and fifth harmonic components having high influence on resolution can be corrected and the sine waveform and cosine waveform where the reference waveform H is adjusted can be obtained, so that the position accuracy and resolution can be further improved.

It is preferable that the second main circuit preferably may include a fifth harmonic correction resistance element with respect to a third harmonic wave.

In the second main circuit, since the fifth harmonic component, which corresponds to the third harmonic wave in the first main circuit, can be corrected, the position accuracy and resolution can be further improved.

It is preferable that the first main circuit and the second main circuit may include one magnetic resistance circuit and the other magnetic resistance circuit where a phase difference between the respective output waveforms is shifted by 90°.

As illustrated in FIG. 4, the phase difference between the respective output waveforms of the first main circuit and the second main circuit is shifted by 90° to output the sine waveform S and the cosine waveform C simultaneously, thereby enabling to detect a relative moving direction and a moving speed of the magnetic position detecting apparatus to the magnetized surface.

It is preferable that one and the other magnetic resistance circuits may be arranged in a comb shape to be parallel to each other along a current passage of each magnetic resistance element and that the magnetic resistance elements of the other magnetic resistance circuit may be placed between the magnetic resistance elements of one magnetic resistance circuit.

Since one magnetic resistance circuits and the other magnetic resistance circuits are arranged in a comb shape, arrangement of the magnetic resistance elements can be made compact with respect to the magnetic pole width ($\lambda$) of the magnetized surface. This makes it possible to reduce a circuit width of the entire magnetic position detecting apparatus having numerous magnetic resistance elements and further improve position accuracy and resolution.

A position detecting apparatus according to a second aspect of the present invention includes first and second main circuits being arranged to be adjacent to each other, being displaced to be opposite to a magnetized surface where different magnetic poles are alternatively arrayed in one direction and being placed in a direction perpendicular to a pole array direction. Each main circuit includes a magnetic resistance circuit having multiple magnetic resistance elements that output current according to magnetic field intensity of the magnetized surface, a power supply terminal provided in each magnetic resistance circuit, and an output terminal. The multiple magnetic resistance elements are connected in series in the magnetic resistance circuit of each main circuit and arranged to be parallel to one another along a current path of each magnetic resistance element. The magnetic resistance circuit of the first main circuit includes a reference magnetic resistance element, an even harmonic correction magnetic resistance element, being placed at a position shifted by $(1/4)\lambda$ or $(3/4)\lambda$ from the reference magnetic resistance element, with respect to a reference wave; and a third harmonic correction magnetic resistance element, being placed at a position shifted by $(1/6)\lambda$ from the reference magnetic resistance element, with respect to a reference wave. The magnetic resistance circuit of the second main circuit includes a reference magnetic resistance element, a fifth harmonic correction magnetic resistance element, being placed at a position shifted by $(1/10)\lambda$ from the adjacent magnetic resistance element, with respect to a reference wave, and a fifth harmonic correction magnetic resistance element, being placed at a position shifted by $(4/15)\lambda$ from the reference magnetic resistance element, with respect to a third harmonic wave.

According to the second aspect of the present invention, the same effect as the aforementioned first aspect of the present invention can be obtained. Particularly, in the second main circuit, since the fifth harmonic component, which corresponds to the third harmonic wave in the first main circuit, can be corrected, the position accuracy and resolution can be further improved.

It is preferable that the first main circuit and the second main circuit may include one magnetic resistance circuit and the other magnetic resistance circuit where a phase difference between the respective output waveforms is shifted by 90°. The phase difference between the respective output waveforms of the first main circuit and second main circuit is shifted by 90° to output the sine waveform S and the cosine waveform C simultaneously, thereby enabling to detect a relative moving direction and a moving speed of the magnetic position detecting apparatus to the magnetized surface.

Further, according to the second aspect of the present invention, it is preferable that one and the other magnetic resistance circuits may be arranged in a comb shape to be parallel to each other along a current passage of each magnetic resistance element and the magnetic resistance elements of the other magnetic resistance circuit may be placed between the magnetic resistance elements of one magnetic resistance circuit.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention will be explained with reference to the drawings.

Figure 5:
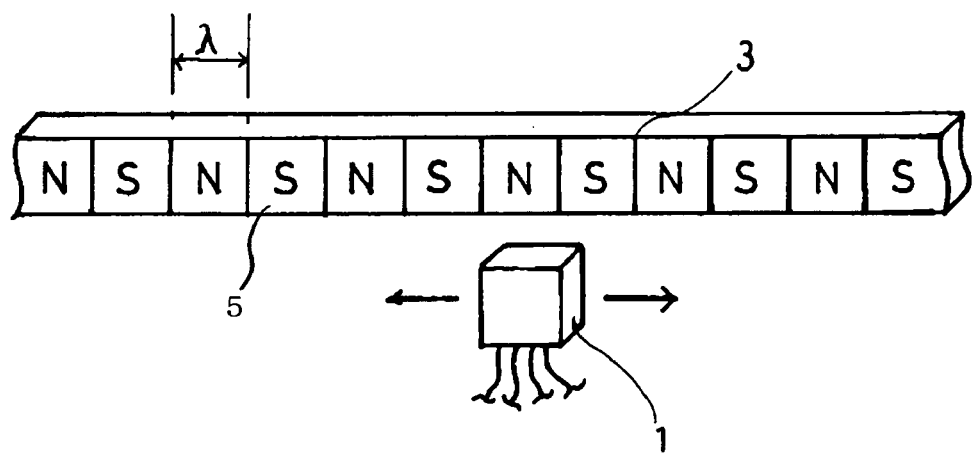
FIG. 5 is a perspective view schematically illustrating a using state of a position detecting apparatus according to one embodiment of the present invention.

A magnetic position detecting apparatus 1 according to this embodiment is one that detects a position of a zoom lens or a focus lens of an autofocus camera built in a cellular phone as an example. As illustrated in FIG. 5, the camera has a magnetized surface 3 that is formed according to the drive of the zoom lens or the focus lens. On the magnetized surface 3, magnetic poles 5 including N poles and S poles are formed to be connected in series, and the N poles and S poles are alternatively formed. A width of one magnetic pole 5 in the array direction of the magnetic pole 5 is $\lambda$.

Figure 2:
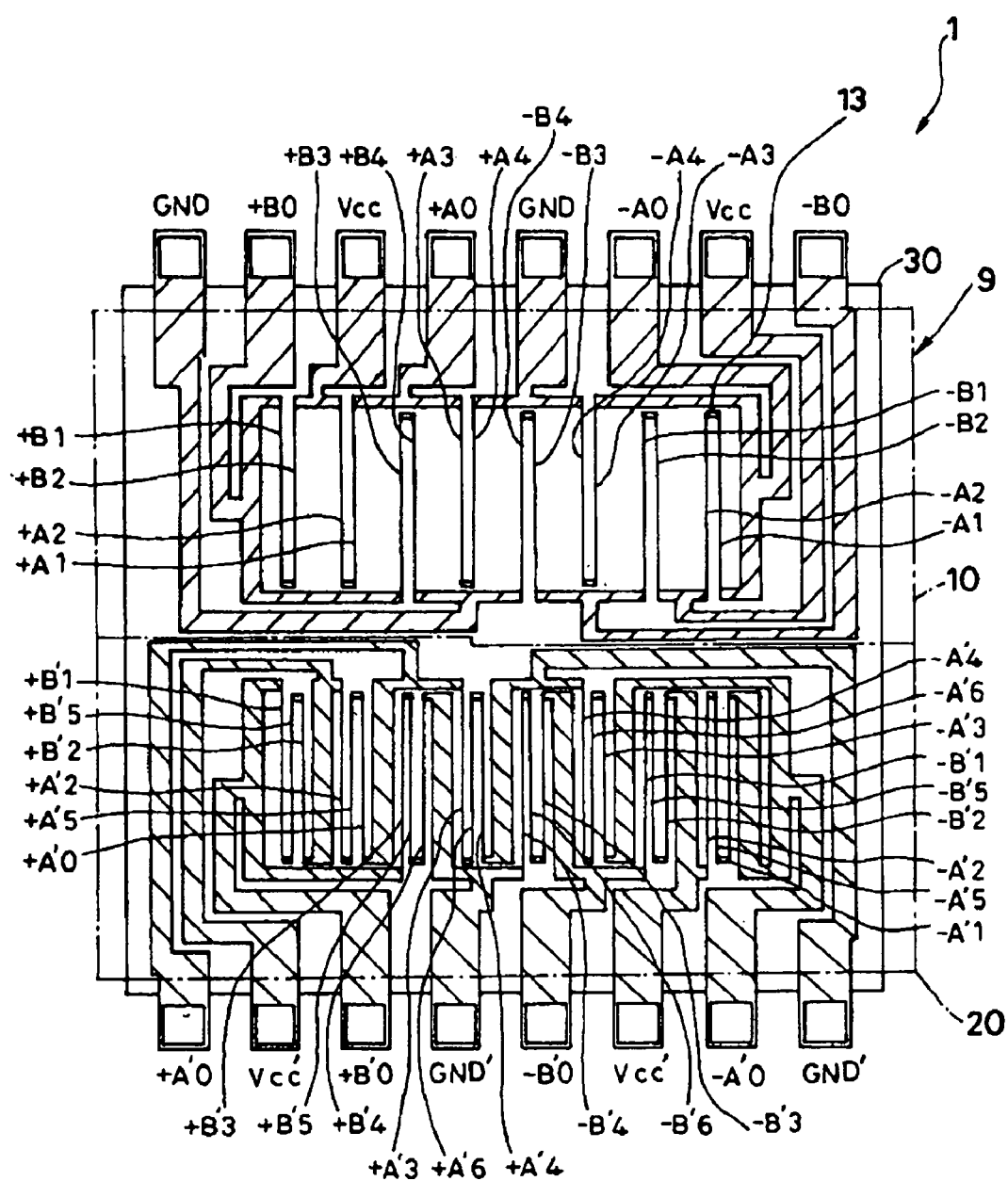
FIG. 2 is a plane view illustrating a pattern circuit of a position detecting apparatus according to one embodiment of the present invention.
Figure 3:
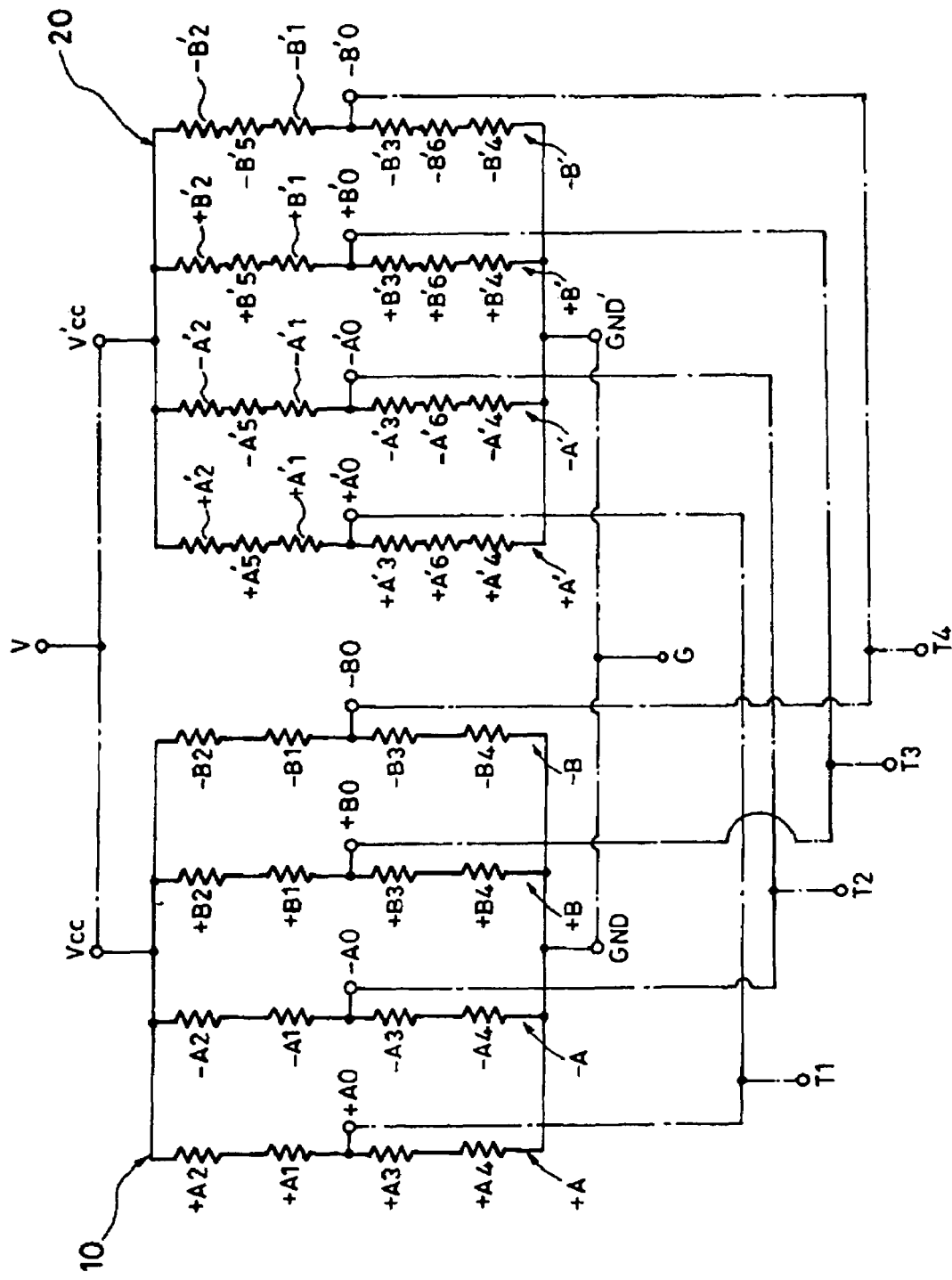
FIG. 3 is an equivalent circuit diagram of a magnetic position detecting apparatus illustrated in FIG. 2.

As illustrated in FIGS. 2 and 3, the magnetic position detecting apparatus 1 includes a circuit 9 (pattern circuit) having a first main circuit 10 and a second main circuit 20 on a base surface 30, and a surface of the circuit 9 is coated with resin material.

the first main circuit 10 includes a first magnetic resistance circuit +A, a second magnetic resistance circuit −A, a third magnetic resistance circuit +B, and a fourth magnetic resistance circuit −B. The first to fourth magnetic resistance circuits +A, −A, +B, −B are connected to a common power source Vcc and a common earth GND, respectively. It is noted that a hatched portion in FIG. 2 is an electrically conducting portion.

The second main circuit 20 includes a first magnetic resistance circuit +A', a second magnetic resistance circuit −A', a third magnetic resistance circuit +B', and a fourth magnetic resistance circuit −B'. The first to fourth magnetic resistance circuits +A', −A', +B', −B' are connected to a common power source V'cc and a common earth GND', respectively. It is noted that T1 to T4 are output terminals and V is a power supply terminal in FIG. 3.

In the present embodiment, one magnetic resistance circuit A in the first main circuit 10 includes the first magnetic resistance circuit +A and the second magnetic resistance circuit −A, and the other magnetic resistance circuit B includes the third magnetic resistance circuit +B and the fourth magnetic resistance circuit −B. Likewise, one magnetic resistance circuit A' in the second main circuit 20 includes the first magnetic resistance circuit +A' and the second magnetic resistance circuit −A', and the other magnetic resistance circuit B' includes the third magnetic resistance circuit +B' and the fourth magnetic resistance circuit −B'.

Regarding the respective main circuits 10 and 20, in one magnetic resistance circuits A, A', the first magnetic resistance circuits +A, +A' and the second magnetic resistance circuits −A, −A' are placed at a position shifted by $\lambda$ (360°), enabling to obtain output waveforms where both outputs are amplified. Similarly, in the other magnetic resistance circuits B, B', the third magnetic resistance circuits +B, +B' and the fourth magnetic resistance circuits −B, −B' are placed at a position shifted by $\lambda$ (360°), enabling to obtain output waveforms where both outputs are amplified. In addition, in the present embodiment, it is possible to obtain outputs that are obtained by further amplifying each of the amplified outputs of the first main circuit 10 and the second main circuit 20 together.

Figure 1:
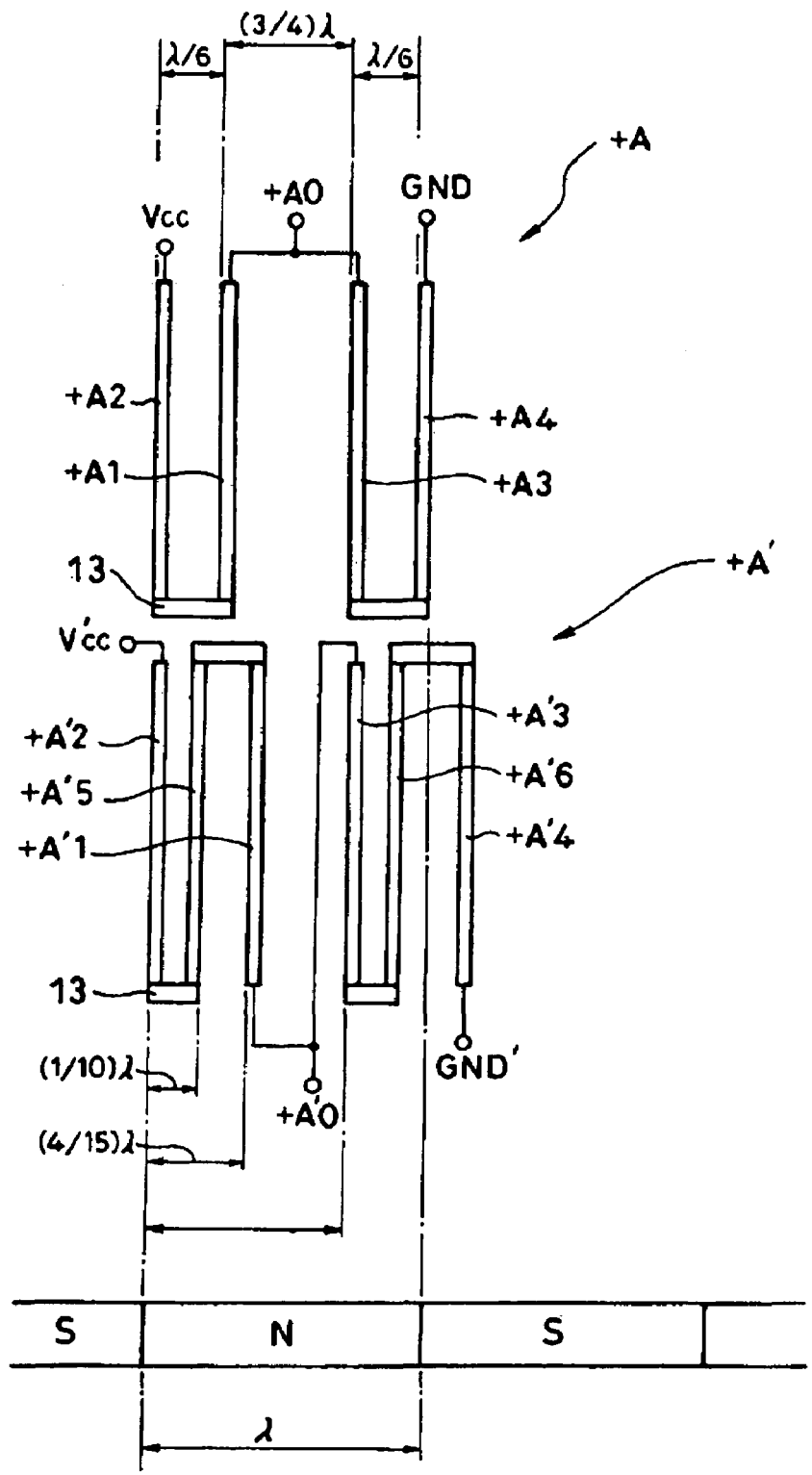
FIG. 1 is a plane view illustrating a relationship between a main part of a pattern circuit illustrated in FIG. 2 and a magnetized surface.

As illustrated in FIG. 1, in the first magnetic resistance circuit +A, a correction magnetic resistance element +A3 for an even harmonic component is placed at a position shifted by $(3/4)\lambda$ with respect to a reference magnetic resistance element +A1. Also, a correction magnetic resistance element +A2 for a third harmonic correction component is placed at a position shifted by $\lambda/6$. Moreover, a correction magnetic resistance element +A4 for a third harmonic component is placed at a position shifted by $\lambda/6$ with respect to the correction magnetic resistance element +A3. Additionally, the correction magnetic resistance element +A3 for an even harmonic component may be placed at a position shifted by $\lambda/4$ with respect to +A1.

In connection with the second to fourth magnetic resistance circuits −A, +B, −B, similar to the first magnetic resistance circuit +A, correction magnetic resistance elements −A3, +B3, −B3 for an even harmonic component are arranged with respect to the reference magnetic resistance circuits −A1, +B1, −B1, respectively, and correction magnetic resistance elements −A2, −A4, +B2, +B4, −B2, −B4 for an even harmonic component are arranged, respectively.

Furthermore, in the first main circuit 10 of the magnetic position detecting apparatus 1, an output terminal of the first magnetic resistance circuit +A is +A0, an output terminal of the second magnetic resistance circuit −A is −A0, and an output terminal of the third magnetic resistance circuit +B is +B0.

The respective magnetic resistance elements +A1 to +A4, −A1 to −A4, +B1 to +B4, −B1 to −B4 are arranged in parallel to one another along a current passage. Moreover, one magnetic resistance circuit +A and the other magnetic resistance circuit +B include magnetic resistance circuits +A1 to +A4 and +B1 to +B4 in such a way to form a comb shape, respectively. The magnetic resistance elements +B3 and +B4 of the other magnetic resistance circuit +B are arranged between the comblike arranged magnetic resistance elements +A2 and +A3 of one magnetic resistance circuit +A. Similarly, in connection with the magnetic resistance circuits −A and −B, the magnetic resistance elements −B3 and −B4 are arranged between the magnetic resistance elements +A4 and −A4. The magnetic resistance elements −B1 and −B2 are arranged between the magnetic resistance elements −A3 and −A2. The magnetic resistance elements −A3 and −A4 are arranged between the magnetic resistance elements −B1 and −B3.

In the respective magnetic resistance circuits A and B, a connecting portion 13 for connecting the parallel-arranged magnetic resistance elements +A1 to +A4, −A1 to −A4, +B1 to +B4, −B1 to −B4 are formed of general conductive material.

While, in the second main circuit 20, as illustrated in FIG. 1, regarding the first magnetic resistance circuit +A', magnetic resistance elements +A'2 and A'5 are arranged at a position shifted by $(1/10)\lambda$ to correct a fifth harmonic component with respect to a basic wave, and magnetic resistance elements +A'1 and A'2 are arranged at a position shifted by $(1/15)\lambda$ to correct a fifth harmonic component with respect to the third harmonic component. Namely, the third harmonic component is $(1/6)\lambda$ and the fifth harmonic component is $(1/10)\lambda$, so that a value obtained by adding both is $(4/15)\lambda$.

The magnetic resistance elements +A'2 is placed at a position shifted by $(3/4)\lambda$ with respect to the magnetic resistance element +A'3 to correct the even harmonic component. Additionally, the magnetic resistance element +A'3 for correcting the even harmonic component may be placed at a position shifted by $\lambda/4$.

Regarding the second to fourth magnetic resistance circuits −A', +B', −B', similar to the first magnetic resistance circuit +A', correction for the fifth harmonic component of the basic wave and correction for the fifth harmonic component with respect to the third harmonic component are made, and correction for the even harmonic component is also performed.

The respective magnetic resistance elements +A' to +A'4, −A'1 to −A'4, +B'1 to +B'4, −B'1 to −B'4 are arranged in parallel to one another along a current passage. Moreover, one magnetic resistance circuit +A' and the other magnetic resistance circuit +B' include magnetic resistance circuits +A'1 to +A'4 and +B'1 to +B'4 in such a way to form a comb shape, respectively. The other magnetic resistance circuit +B' is placed between the comblike arranged magnetic resistance elements of one magnetic resistance circuit +A'.

An explanation will be next given of a function and an effect according to the present embodiment.

According to the embodiment of the present invention, since the first main circuit 10 and the second main circuit 20 are arranged to be adjacent to each other in a direction perpendicular to a magnetic pole array direction, it is possible to reduce an area in the magnetic pole array direction and improve miniaturization of a position detecting apparatus 1. Particularly, the detection width of the position detecting apparatus is reduced with respect to the magnetic pole array direction, thus allowing a reduction in an interval difference and magnetic field intensity between each magnetic resistance element and the magnetized surface even when the magnetized surface is circularly shaped or curved as illustrated in FIG. 6. This makes it possible to obtain an output waveform with high resolution.

The outputs from the first and second main circuits 10 and 20 are added to each other, thereby making it possible to obtain a waveform of the doubled output.

In the first main circuit 10 and second main circuit 20, the even harmonic component and odd harmonic component at each output waveform are corrected, thereby making it possible to obtain a sine waveform and a cosine waveform where a reference waveform H is adjusted and further improve position accuracy and resolution.

In the first second main circuit 20, since the fifth harmonic component, which corresponds to the third harmonic component in the first main circuit 10, can be corrected, it is possible to further improve position accuracy and resolution.

Additionally, since it is needless to say that the even harmonic component is corrected in the second main circuit 20, it is possible to further improve position accuracy and resolution.

In the respective first and second main circuits 10 and 20, since one magnetic resistance circuits +A and +A' and the other magnetic resistance circuits +B and +B' are arranged in a comb shape, arrangement of the magnetic resistance elements can be made compact with respect to the magnetic pole width λ of the magnetized surface. This makes it possible to reduce a circuit width of the entire magnetic position detecting apparatus having numerous magnetic resistance elements and further improve position accuracy and resolution.

Figure 4:
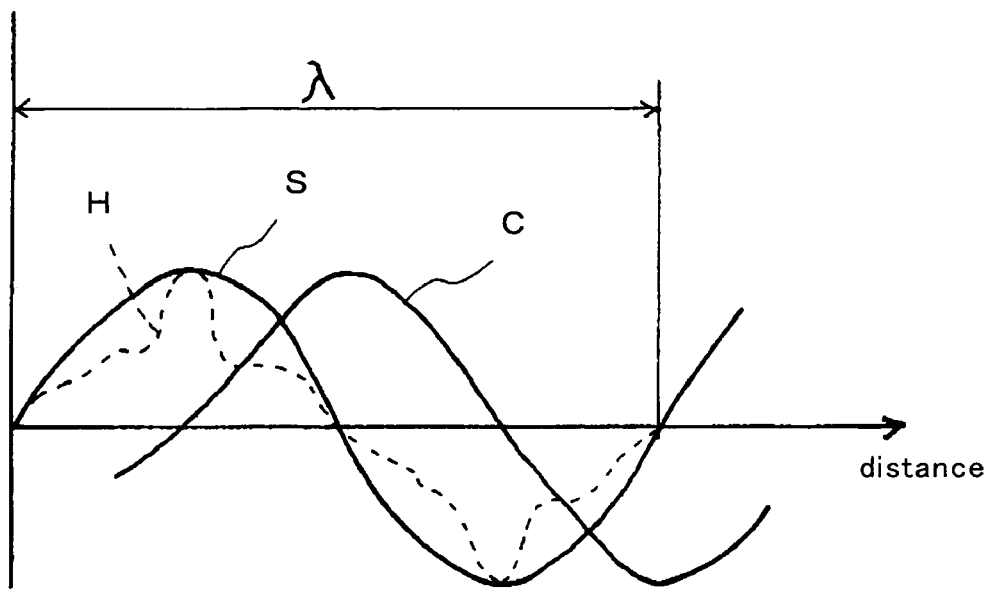
FIG. 4 is a view of an output waveform obtained from a magnetic position detecting apparatus illustrated in FIG. 2.

Moreover, in the present embodiment, as illustrated in FIG. 4, the sine waveform S and the cosine waveform C are output simultaneously, thereby enabling to detect a relative moving direction and a moving speed of the magnetic position detecting apparatus 1 to the magnetized surface 3. Thus, the detection of the moving speed makes it possible to substantially simultaneously set the zoom lens and the focus lens of the camera when the magnetic position detecting apparatus is used as a position sensor that drives the zoom lens and the focus lens as an application example.

The present invention is not limited to the aforementioned embodiment and various modifications may be possible without departing from the gist of the present invention.

Figure 6A:
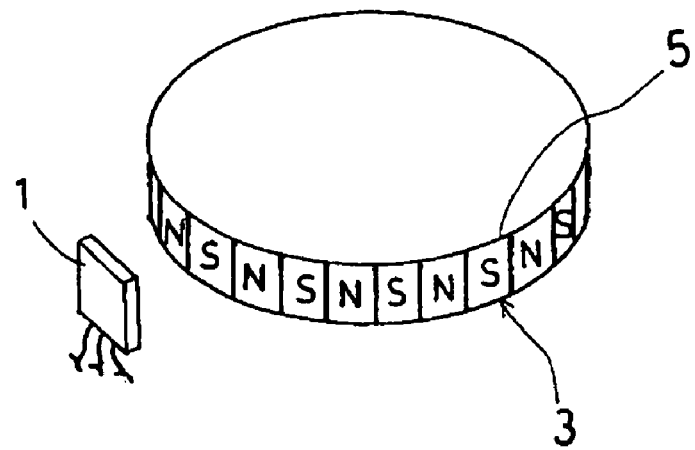
FIG. 6a is a perspective view illustrating a magnetic position detecting apparatus according to a modification of the present invention.
Figure 6B:
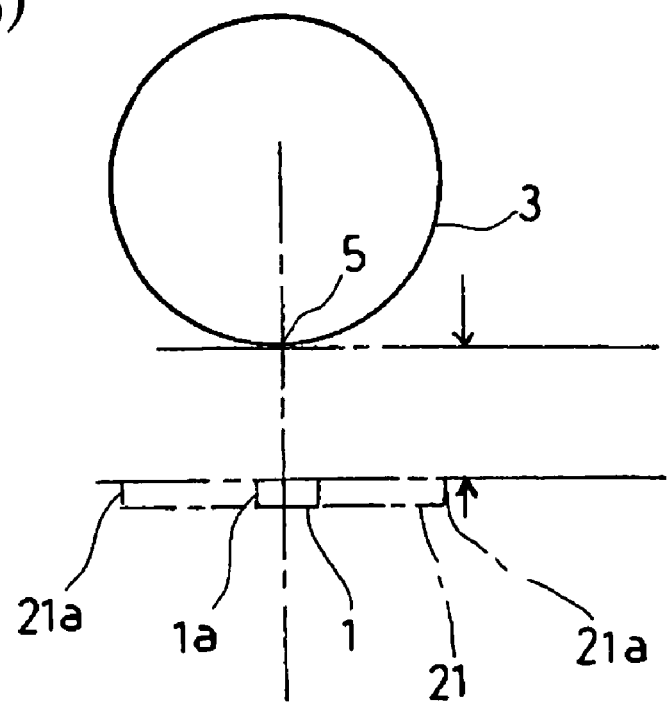
FIG. 6b is a plane view illustrating a magnetic position detecting apparatus according to a modification of the present invention.

For example, the position detecting apparatus 1 is not limited to one for linear driving. Namely, the magnetized surface 3 may be formed along the circumference as illustrated in FIG. 6a and the rotational position thereof may be detected by the magnetic position detecting apparatus 1. In this case, as illustrated in FIG. 6b, when the respective magnetic resistance circuits are horizontally arranged (shown by an alternate long and short dash line in the figure) as in the conventional technique, there is a disadvantage in which magnetic field strength received at both ends 21a is reduced. However, since the magnetic position detecting apparatus 1 according to the present embodiment reduces the width in the magnetizing direction, it is possible to decrease the difference in magnetic intensity which each magnetic resistance element receives at the end portion 1a. This allows highly accurate position detection as compared with the conventional case.

The magnetic position detecting apparatus 1 according to the present invention is not limited to the camera. That is to say, the magnetic position detecting apparatus 1 can be used in position control of a machine tool and can be used as a so-called encoder and the use thereof is not limited.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A position detecting apparatus comprising:
   first and second main circuits being arranged to be adjacent to each other, being displaced to be opposite to a magnetized surface where different magnetic poles are alternatively arrayed in one direction, and being placed in a direction perpendicular to a pole array direction;
   each main circuit including:
   a magnetic resistance circuit having multiple magnetic resistance elements that output current according to magnetic field intensity of the magnetized surface;
   a power supply terminal provided in each magnetic resistance circuit; and
   an output terminal;
   wherein the multiple magnetic resistance elements are connected in series in the magnetic resistance circuit and arranged to be parallel to one another along a current path of each magnetic resistance element; and
   wherein the magnetic resistance circuit of each of the first main circuit and the second main circuit includes:
   a reference magnetic resistance element;
   an even harmonic correction magnetic resistance element with respect to a reference wave; and
   an odd harmonic correction magnetic resistance element with respect to a reference wave.

2. The position detecting apparatus according to claim 1, wherein the odd harmonic correction magnetic resistance element of the first main circuit is a third harmonic correction magnetic resistance element with respect to the reference wave, and the odd harmonic correction magnetic resistance element of the second main circuit is a fifth harmonic correction magnetic resistance element.

3. The position detecting apparatus according to claim 2, wherein the second main circuit includes a fifth harmonic correction resistance element with respect to a third harmonic wave.

4. The position detecting apparatus according to claim 1, wherein the first main circuit and the second main circuit include one magnetic resistance circuit and the other magnetic resistance circuit where a phase difference between the respective output waveforms is shifted by 90°.

5. The position detecting apparatus according to claim 1, wherein one and the other magnetic resistance circuits are arranged in a comb shape to be parallel to each other along a current passage of each magnetic resistance element and the magnetic resistance elements of the other magnetic resistance circuit are placed between the magnetic resistance elements of one magnetic resistance circuit.

6. A position detecting apparatus comprising:
   first and second main circuits being arranged to be adjacent to each other, being displaced to be opposite to a magnetized surface where different magnetic poles are alternatively arrayed in one direction and being placed in a direction perpendicular to a pole array direction;
   each main circuit including:
   a magnetic resistance circuit having multiple magnetic resistance elements that output current according to magnetic field intensity of the magnetized surface;
   a power supply terminal provided in each magnetic resistance circuit; and
   an output terminal;
   wherein the multiple magnetic resistance elements are connected in series in the magnetic resistance circuit of each main circuit and arranged to be parallel to one another along a current path of each magnetic resistance element; and
   wherein the magnetic resistance circuit of the first main circuit includes:
   a reference magnetic resistance element;

an even harmonic correction magnetic resistance element, being placed at a position shifted by $(1/4)\lambda$ or $(3/4)\lambda$ from the reference magnetic resistance element, with respect to a reference wave;

a third harmonic correction magnetic resistance element, being placed at a position shifted by $(1/6)\lambda$ from the reference magnetic resistance element, with respect to a reference wave; and wherein the magnetic resistance circuit of the second main circuit includes:

a reference magnetic resistance element;

a fifth harmonic correction magnetic resistance element, being placed at a position shifted by $(1/10)\lambda$ from the adjacent magnetic resistance element, with respect to a reference wave;

a fifth harmonic correction magnetic resistance element, being placed at a position shifted by $(4/15)\lambda$ from the reference magnetic resistance element, with respect to a third harmonic wave.

7. The position detecting apparatus according to claim 6, wherein the first main circuit and the second main circuit include one magnetic resistance circuit and the other magnetic resistance circuit where a phase difference between the respective output waveforms is shifted by 90°.

8. The position detecting apparatus according to claim 6, wherein one and the other magnetic resistance circuits are arranged in a comb shape to be parallel to each other along a current passage of each magnetic resistance element and the magnetic resistance elements of the other magnetic resistance circuit are placed between the magnetic resistance elements of one magnetic resistance circuit.

* * * * *